United States Patent [19]
Ohtsuka

[11] Patent Number: 5,679,097
[45] Date of Patent: Oct. 21, 1997

[54] SPEED CHANGE CONTROL UNIT FOR AN AUTOMATIC TRANSMISSION

[75] Inventor: Toshio Ohtsuka, Hyogo-ken, Japan

[73] Assignee: Mitsubishi Denki Kabushiki Kaisha, Tokyo, Japan

[21] Appl. No.: 581,330

[22] Filed: Dec. 29, 1995

[30] Foreign Application Priority Data

Mar. 3, 1995 [JP] Japan ................. 7-044400

[51] Int. Cl.$^6$ ................. F16H 59/30; F16H 59/36
[52] U.S. Cl. ................. 477/121; 477/129; 477/154; 477/155
[58] Field of Search ................. 477/121, 128, 477/129, 154, 155

[56] References Cited

U.S. PATENT DOCUMENTS

| | | | |
|---|---|---|---|
| 3,759,344 | 9/1973 | Blee et al. | 477/121 X |
| 4,324,153 | 4/1982 | Sugimoto et al. | 477/121 X |
| 4,739,483 | 4/1988 | Ina et al. | 477/121 X |
| 5,291,803 | 3/1994 | Yamaguchi | 477/34 |
| 5,303,153 | 4/1994 | Sakai et al. | 477/121 X |
| 5,405,301 | 4/1995 | Yagi et al. | 477/120 |
| 5,421,793 | 6/1995 | Kashiwabara | 477/121 X |

*Primary Examiner*—Charles A. Marmor
*Assistant Examiner*—Nathan O. Jensen
*Attorney, Agent, or Firm*—Sughrue, Mion, Zinn, Macpeak & Seas, PLLC

[57] ABSTRACT

A control unit 11b which consists of a microcomputer compensates the detected intake manifold pressure Pb with an atmospheric pressure, obtains a first estimated position of the throttle when the amount of by-pass air is null and a second estimated position of the throttle when the mount of by-pass air is the maximum from the intake manifold pressure compensated with the atmospheric pressure and the detected revolution speed Ne, obtains the ratio of the amount of by-pass air currently under control to the maximum controllable amount of by-pass air, estimates the position of the throttle from the ratio and the first and second estimated positions of the throttle, and collates the estimated position of the throttle after compensation and the detected vehicle speed $V_s$ with the speed change map to shift the gear of the automatic transmission 3. This provides a feeling of smooth ride by eliminating use of the throttle position detection means and the step of learning the completely closed position of the throttle valve.

9 Claims, 4 Drawing Sheets

SPEED CHANGE CONTROL UNIT FOR AN AUTOMATIC TRANSMISSION

BACKGROUND OF THE INVENTION

1. [Field of the Invention]

This invention relates to a speed change control unit for an automatic transmission, which automatically changes a transmission gear by collating a position of a throttle and a speed of a vehicle with a speed change map.

2. [Description of the Prior Art]

Among speed change control units for automatic transmissions mounted on vehicles, there is one known which automatically changes the gear of an automatic transmission by collating a position of a throttle detected by throttle position detection means and a speed of a vehicle detected by vehicle speed detection means with a prestored speed change map.

However, since the throttle position detection means of such a conventional speed change control unit has an allowable range of detection error, it is necessary to learn a completely closed position of a throttle valve from the ON/OFF operation of an idle switch. In addition, since each transmission gear is fixed on the speed change map, if a certain gear is set for driving on a flat road, an engine torque becomes lower at the time of driving on a slope than at the time of driving on a flat road upon up-shift. When a driver who feels a reduction in engine output steps on the accelerator, the speed change control unit shifts the automatic transmission to a low gear to accelerate the speed of a vehicle. When the driver releases the accelerator, the speed change control unit shifts up the automatic transmission. In this way, the process from stepping on the accelerator to down-shift, acceleration, release of the accelerator, and up-shift is repeated, thus providing a feeling of unsmooth ride. Further, since parameters are based on values obtained at the time of driving on a flat road, a shift shock is generated due to a reduction in engine output at the time of driving on a slope.

SUMMARY OF THE INVENTION

This invention has been made to overcome the above problems and it is therefore a first object of the invention to eliminate use of the throttle position detection means and the step of learning the completely closed position of the throttle valve. A second object of the invention is to provide a feeling of smooth ride which is not affected by changes in atmospheric pressure and a third object of the invention is to provide a feeling of smoother ride.

According to the invention, there is provided a speed change control unit which comprises revolution speed detection means for detecting a revolution speed of an engine, intake manifold pressure detection means for detecting a pressure of an intake manifold in an engine air system, vehicle speed detection means for detecting a speed of a vehicle, throttle position estimation means for estimating a position of a throttle from the detected revolution speed of the engine and the detected pressure of the intake manifold, and speed change decision means for shifting the gear of an automatic transmission by collating the estimated position of the throttle and the detected speed of the vehicle with a prestored speed change map.

Further according to the present invention, there is provided a speed change control unit which further comprises atmospheric pressure detection means for detecting an atmospheric pressure and pressure compensation means for compensating the detected pressure of the intake manifold with the detected atmospheric pressure and providing the compensated pressure to the throttle position estimation means.

The present invention also provides a speed change control unit which further comprises by-pass air detection means for detecting an amount of by-pass air which by-passes a throttle valve in the engine air system, by-pass air flow ratio calculation means for calculating a ratio of the detected amount of by-pass air to the predetermined controllable amount of by-pass air, and throttle position compensation means for compensating the estimated position of the throttle with the calculated flow ratio and providing the compensated position of the throttle to the speed change decision means.

Since a position of the throttle is estimated from the detected revolution speed of the engine and the detected pressure of the intake manifold, and the gear of the automatic transmission is shifted by collating the estimated position of the throttle and the detected speed of the vehicle with the prestored speed change map, use of the throttle position detection means and the step of learning the completely closed position of the throttle valve can be eliminated.

Since a position of the throttle is estimated using the pressure of the intake manifold compensated with an atmospheric pressure, a position of the throttle is compensated such that it is higher than when the detected pressure of the intake manifold is used in order to lengthen driving with a low gear on a slope, i.e., as atmospheric pressure lowers, with the same position of the throttle, whereby drive force is increased and a feeling of smooth ride can be provided.

Since the estimated position of the throttle is compensated by a ratio of the amount of by-pass air currently under control to the controllable amount of by-pass air, a feeling of smoother ride can be obtained.

The above and other objects, features and advantages of the invention will become more apparent from the following description when taken in conjunction with the accompanying drawings.

DESCRIPTION OF THE PREFERRED EMBODIMENT

A preferred embodiment of the present invention is described hereinunder with reference to the accompanying drawings.

Figure 1:
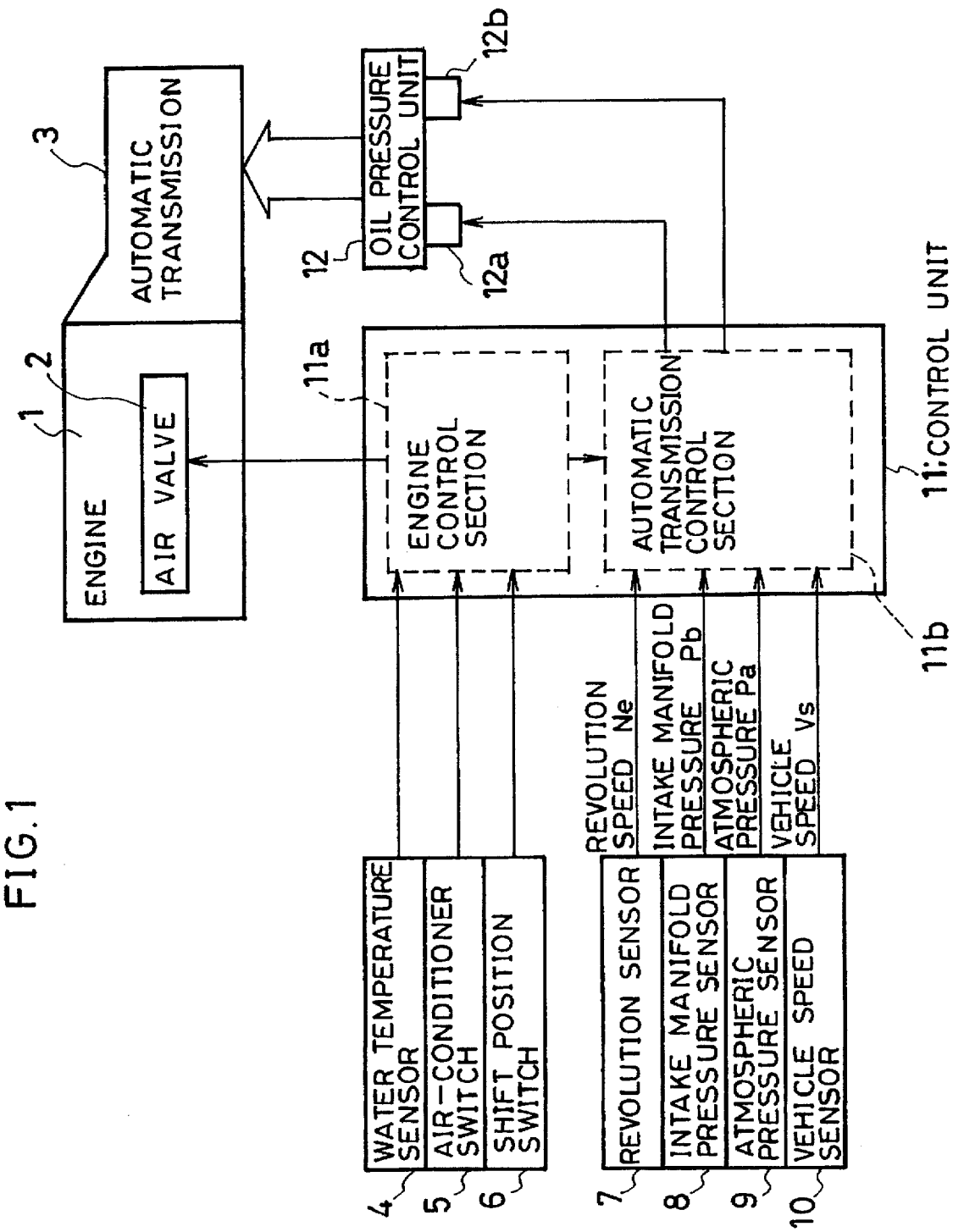
FIG. 1 is a diagram showing the entire configuration of an embodiment of the present invention.

In FIG. 1, reference numeral 1 represents an engine mounted on a vehicle, 2 an air valve formed of an electromagnetic valve for controlling the amount of by-pass air which passes through a by-pass passage by-passing a throttle valve in the air system of the engine 1, 3 an automatic transmission for converting the output of the engine 1 and transmitting the converted output to the drive system of the vehicle, 4 a water temperature sensor as coolant temperature detection means for detecting the temperature of cooling water and generating an electric signal corresponding to the detected temperature, 5 an air-conditioner switch for starting and stopping the operation of an air-conditioner mounted on the vehicle, 6 a shift position switch as transmission position detection means for detecting a position of the automatic transmission and generating an electric signal corresponding to the position, 7 a revolution sensor as revolution speed detection means for detecting a revolution speed of the engine 1 and generating an electric signal corresponding to the detected revolution speed, 8 an intake manifold pressure sensor as intake manifold pressure detection means for detecting a pressure in the intake manifold constituting a passage from an air cleaner to the throttle valve in the air system of the engine 1 and for generating an electric signal corresponding to the detected pressure in the intake manifold, 9 an atmospheric pressure sensor as atmospheric pressure detection means for detecting an atmospheric pressure and generating an electric signal corresponding to the detected atmospheric pressure, and 10 a vehicle speed sensor as vehicle speed detection means for detecting a speed of the vehicle equipped with the engine 1.

Reference numeral 11 represents a control unit for controlling the engine 1 and the automatic transmission 3 integrally, which is constituted by a microcomputer which operates according to a preset program and which comprises an engine control section 11a and an automatic transmission control section 11b.

The engine control section 11a receives over a cable a water temperature signal from the water temperature sensor 4, an ON/OFF signal from the air-conditioner switch 5, and a transmission position signal from the shift position switch 6, calculates an amount of by-pass air in accordance with the temperature of cooling water for the engine 1, start and stop of the air-conditioner and the position of the transmission, and supplies over the cable an electric signal corresponding to the calculated amount of by-pass air to the air valve 2, whereby a position of the air valve 2 is controlled such that the section of the position of the by-pass passage by-passing the throttle valve becomes the section of the position corresponding to the temperature of cooling water, start and stop of the air-conditioner and the position of the transmission. Thereby, the amount of by-pass air flowing through the by-pass passage is controlled.

The automatic transmission control section 11b receives over the cable a revolution speed (engine revolution speed) signal from the revolution sensor 7, an intake manifold pressure signal from the intake manifold pressure sensor 8, an atmospheric pressure signal from the atmospheric pressure sensor 9, and a vehicle speed signal from the vehicle speed sensor 10, as well as a by-pass air amount signal from the engine control section 11a over a data line, calculates a speed gear corresponding to a revolution speed of the engine Ne, an intake manifold pressure Pb, an atmospheric pressure Pa, a vehicle speed Vs, and a by-pass air amount Qbpa, and supplies an electric signal corresponding to the calculated speed gear to electromagnetic valves 12a and 12b of an oil pressure control unit 12 over the cable, whereby position/closing of the electromagnetic valves 12a and 12b are controlled. As the result, engagement and release of a friction engagement mechanism within the automatic transmission 3 are controlled by changing an oil passage within the oil pressure control unit 12 so that a speed gear is obtained by a combination of a train of gears of the automatic transmission 3.

Figure 2:
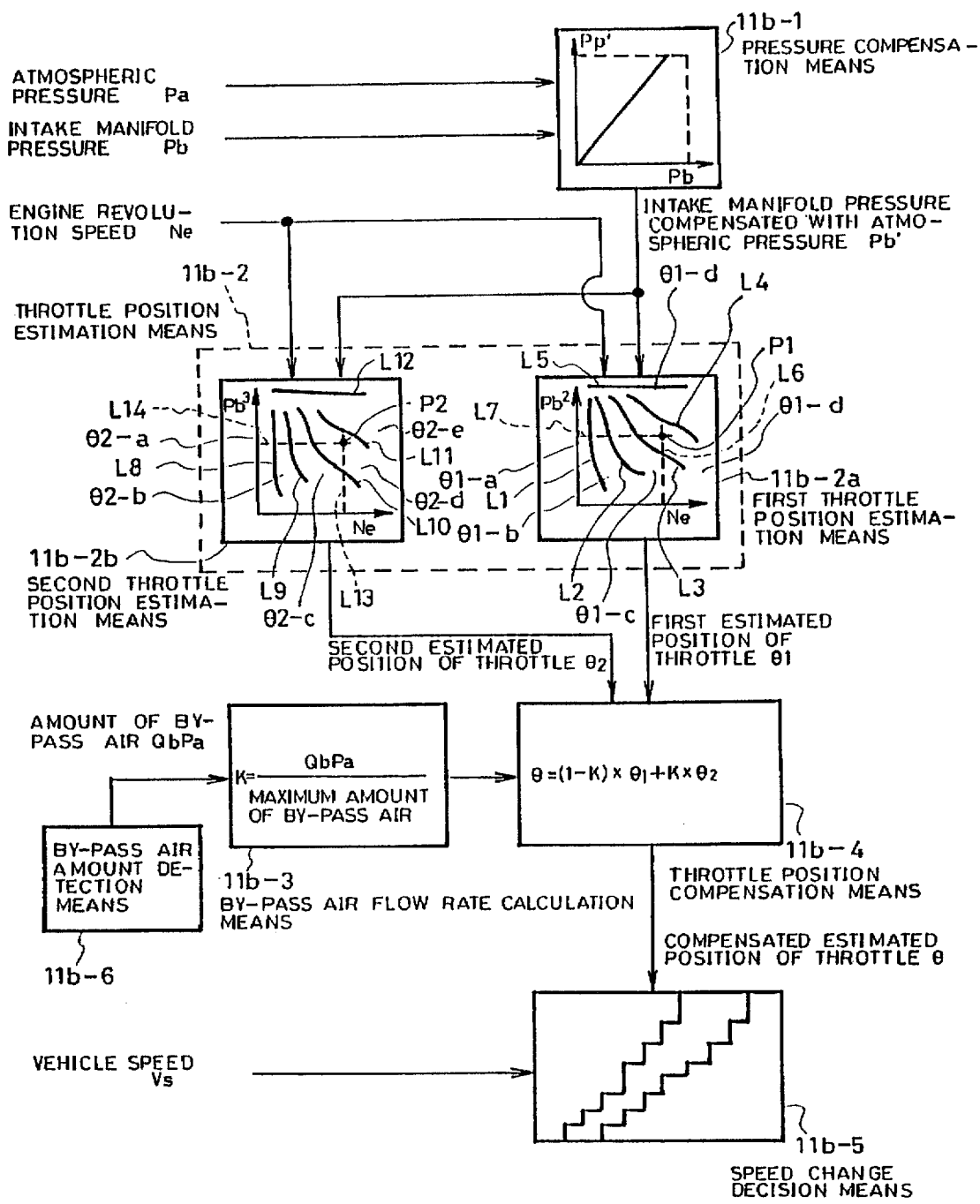
FIG. 2 is a block diagram of the internal configuration of a speed change control unit of the embodiment.

The above-described automatic transmission control section 11b, as shown in FIG. 2, comprises pressure compensation means 11b-1, throttle position estimation means 11b-2, by-pass air amount ratio calculation means 11b-3, throttle position compensation means 11b-4, speed change decision means 11b-5, and by-pass air amount detection means 11b-6.

The pressure compensation means 11b-1 which includes a preset pressure compensation calculation expression, Pb'= 760/Pa×Pb, calculates an atmospheric pressure-compensated intake manifold pressure Pb' by substituting an atmospheric pressure from the atmospheric pressure sensor 9 for Pa and an intake manifold pressure from the intake manifold pressure sensor 8 for Pb, and supplies the calculated pressure to the throttle position estimation means 11b-2.

The throttle position estimation means 11b-2 comprises first throttle position estimation means 11b-2a for calculating a first estimated position of the throttle θ1 when the amount of by-pass air is null and second throttle position estimation means 11b-2b for calculating a second estimated position of the throttle θ2 when the amount of by-pass air is the maximum.

The first throttle position estimation means 11b-2a which includes an estimation map which is preset based on the condition that the amount of by-pass air is null collates the intake manifold pressure compensated with the atmospheric pressure Pb' from the pressure compensation means 11b-1 and the revolution speed Ne from the revolution sensor 7 with the estimation map to obtain a first estimated position of the throttle θ1 when the amount of by-pass air is null, and supplies the estimated value to the throttle position compensation means 11b-4. In concrete terms, on the compensation map included in the first throttle position estimation means 11b-2a, revolution speed Ne is plotted at the axis of abscissas and atmospheric pressure compensated intake manifold pressure Pb' at the axis of ordinates perpendicular to the axis of abscissas, and solid characteristic curves L1, L2, L3, L4 and L5 for defining a plurality of the first estimated positions of the throttles θ1-a, θ1-b, θ1-c, θ1-d, θ1-e are drawn on a flat plane defined by the axis of abscissas and the axis of ordinates. The first throttle position estimation means 11b-2a plots revolution speed Ne from the revolution sensor at the axis of abscissas of the compensated map and intake manifold pressure compensated with atmospheric pressure Pb' from the pressure compensation means 11b-1 at the axis of ordinates of the compensated map. When an intersection P1 of two straight dotted lines L6 and L7 which extend from plotted points on these axes and are parallel to these axes is located in the area between characteristic curves L3 and L4 on the compensation map, the first estimated position of the throttle θ1-d is supplied to the throttle position compensation means 11b-4 as the first estimated position of the throttle θ1.

The second throttle position estimation means 11b-2b which includes an estimation map which is preset based on the condition that the amount of by-pass air is the maximum collates the intake manifold pressure compensated with the atmospheric pressure Pb' from the pressure compensation means 11b-1 and the revolution speed Ne from the revolution sensor 7 with the estimation map to obtain a second estimated position of the throttle θ2 when the amount of by-pass air is the maximum, and supplies the estimated value to the throttle position compensation means 11b-4. In concrete terms, on the compensation map included in the second position of the throttle estimation means 11b-2, revolution speed Ne is plotted at the axis of abscissas and intake manifold pressure compensated with atmospheric pressure Pb' at the axis of ordinates perpendicular to the axis of abscissas and solid characteristic curves L8, L9, L10, L11 and L12 for defining a plurality of the second estimated positions of the throttle θ2-a, θ2-b, θ2-c, θ2-d and θ2-e are drawn on a flat plane defined by the axis of abscissas and the axis of ordinates. The second throttle position estimation means 11b-2 plots revolution speed Ne from the revolution sensor 7 at the axis of abscissas of the compensation map and intake manifold pressure compensated with atmospheric pressure Pb' from the pressure compensation means 11b-1 at the axis of ordinates of the estimation map. When an intersection P2 of two straight dotted lines L13 and L14 which extend from plotted points on these axes and are parallel to these axes is located in the area between the characteristic curves L10 and L11 on the compensation map, the second estimated position of the throttle θ2-d is supplied to the throttle position compensation means 11b-4 as the second estimated position of the throttle θ2.

The by-pass air flow rate calculation means 11b-3 receives an amount of by-pass air Qbpa from the engine control section 11a as the amount of by-pass air currently under control from the by-pass air amount detection means 11b-6, calculates the ratio of the received amount of bypass air currently under control and the maximum controllable amount of by-pass air (flow rate), K=Qbpa/maximum amount of by-pass air, and supplies the ratio to the throttle position compensation means 11b-4.

The throttle position compensation means 11b-4 which includes a preset position compensation calculation expression, θ=(1−K)×θ1+K×θ2, calculates a compensated estimated position of the throttle θ by substituting the first estimated position of the throttle from the first throttle position estimation means 11b-2a for θ1, the second estimated position of the throttle from the second throttle position estimation means 11b-2b for θ2, and the ratio from the by-pass air flow rate calculation means 11b-3 for K, and supplies the calculated value to the speed change decision means 11b-5.

The speed change decision means 11b-5 which includes a preset speed change map collates the compensated estimated position of the throttle θ from the throttle position compensation means 11b-4 and the vehicle speed Vs from the vehicle sensor 10 with the speed change map to obtain gears for a first speed, second speed, third speed, etc., and supplies the thus obtained gears to the oil pressure control unit 12 shown in FIG. 1 so that the gear of the automatic transmission 3 is changed.

Figure 4:
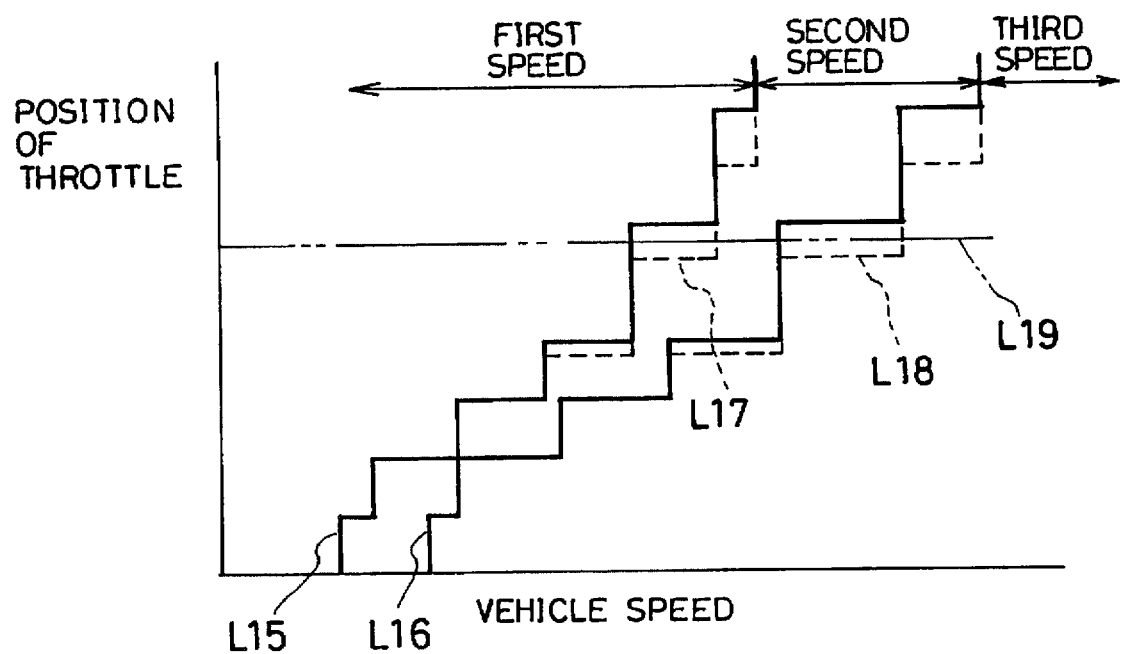
FIG. 4 is a diagram showing a speed change map for explaining the function of the embodiment.

A description is subsequently given of the operation of this embodiment mainly focused on the speed change control of the automatic transmission control section 11b with reference to the flow chart of FIG. 4. When a driver turns on a power switch and a starter switch by inserting an unshown key plate into the ignition key hole of a vehicle, the control unit 1 is activated by turning on the power switch and the engine 1 is also activated by turning on the starter switch. The activated control unit 11 starts the execution of speed change control processing. In step 101, the control unit 11 carries out input processing for reading a revolution speed Ne from the revolution sensor 7, an intake manifold pressure Pb from the intake manifold pressure sensor 8, an atmospheric pressure Pa from the atmospheric sensor 9 and a vehicle speed Vs from the vehicle speed sensor 10 and then proceeds to step 102. In step 102, the control unit 11 calculates an intake manifold pressure compensated with the atmospheric pressure Pb' by inserting the atmospheric pressure Pa and the intake manifold pressure Pb read in step 101 into the pressure compensation calculation expression, Pb'= 760/Pa×Pb, to compensate the intake manifold pressure with the atmospheric pressure, and then the routine proceeds to step 103. In step 103, the control unit 11 collates the revolution speed Ne read in step 101 and the intake manifold pressure compensated with the atmospheric pressure Pb' obtained in step 102 with a position compensation map to derive a first estimated position of the throttle θ1 when the amount of by-pass air is null and a second estimated position of the throttle θ2 when the amount of by-pass air is the maximum, and then proceeds to step 104. In step 104, the control unit 11 calculates the amount of by-pass air currently under control Qbpa in response to a by-pass air amount signal from the engine control section 11a. The amount of by-pass air currently under control is obtained as an amount of air per duty (%)×1 duty (%) in the case of an electromagnetic valve in which the air valve 2 is duty controlled like this embodiment, and then the routine proceeds to step 105. In step 105, the ratio of the amount of by-pass air currently under control obtained in step 104 to the preset maximum controllable amount of by-pass air, K=Qbpa/ maximum amount of by-pass air, is calculated, and the routine proceeds to step 106. In step 106, a compensated estimated position of the throttle θ is calculated by inserting the first estimated position of the throttle θ1 and the second estimated position of the throttle θ2 obtained in step 103 and the ratio K obtained in step 105 into the position compensation calculation expression, θ=(1−K)×θ1+k×θ2, and the routine proceeds to step 107. In step 107, the compensated estimated position of the throttle θ obtained in step 106 is collated with the speed change map to calculate a transmission gear corresponding to the revolution speed Ne, the intake manifold pressure Pb, the atmospheric pressure Pa and the vehicle speed Vs read in step 101 and the amount of by-pass air Qbpa obtained in step 104 and provides the calculated value to the oil pressure control unit 12 so as to shift the gear of the automatic transmission 3. Processings from step 101 to step 107 are repeated until the power switch of the ignition key is turned off.

In short, according to this embodiment, the intake manifold pressure Pb detected by the intake manifold pressure sensor 8 is compensated with an atmospheric pressure to obtain an intake manifold pressure compensated with an atmospheric pressure Pb', the first estimated position of the throttle θ1 when the amount of by-pass air is null and the second estimated position of the throttle θ2 when the amount of by-pass air is the maximum are obtained from the intake manifold pressure compensated with the atmospheric pressure Pb' and the revolution speed Ne detected by the revolution sensor 7, the compensated estimated position of the throttle θ is estimated from the first and second estimated positions of the throttle θ1 and θ2 and the ratio K, and this compensated estimated position of the throttle θ and the vehicle speed Vs detected by the vehicle speed sensor 10 are collated with the speed change map to shift the gear of the automatic transmission 3. Therefore, use of the throttle position detection means and the step of learning the completely closed position of the throttle valve can be eliminated. In other words, when the intake manifold pressure sensor 8, the atmospheric pressure sensor 9 and the vehicle speed sensor 10 used for integrated control of the engine 1 and the automatic transmission 3 are utilized like this embodiment, use of the throttle position detection means and the step of learning the completely closed position of the throttle valve can be eliminated and also the current program used for the integrated control can be used, thereby making it possible to reduce costs.

Figure 3:
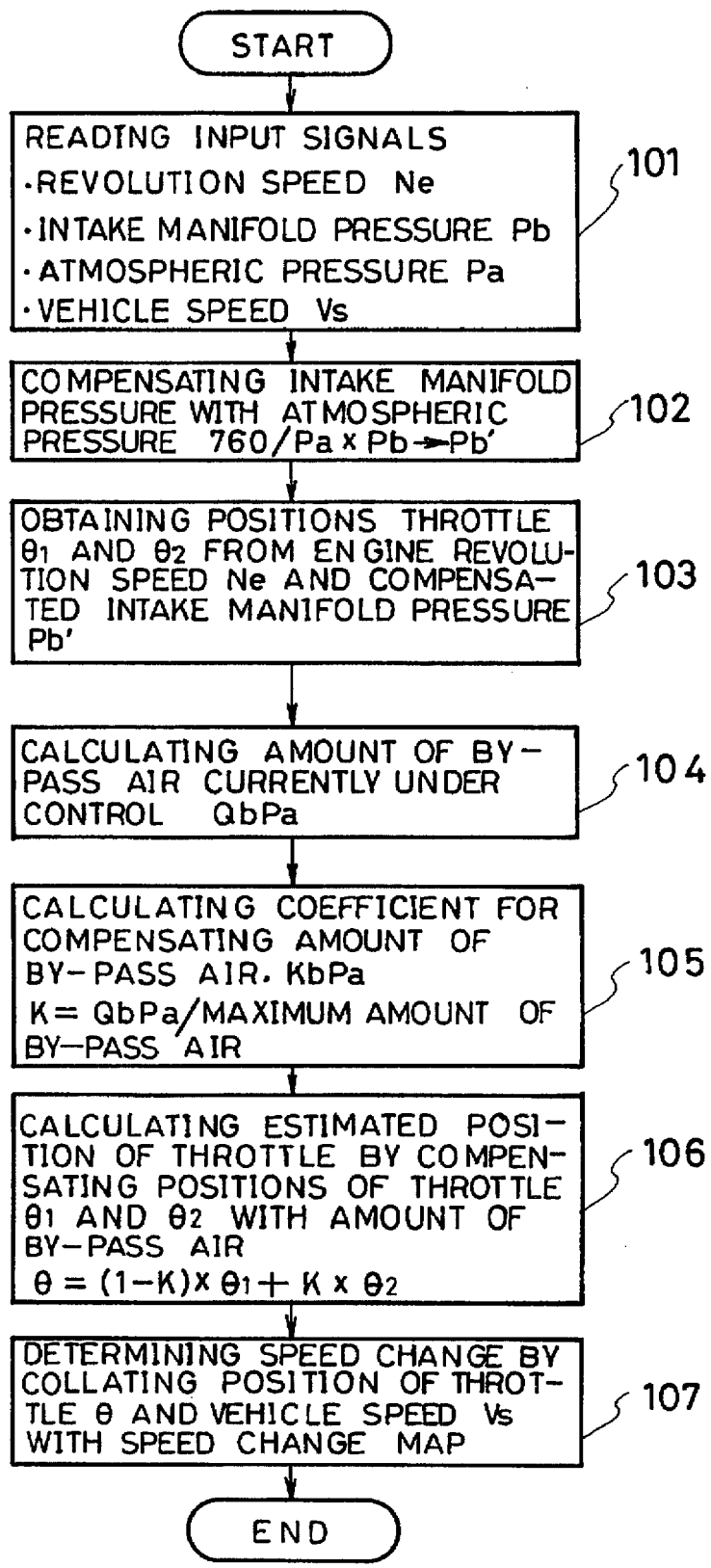
FIG. 3 is a flow chart of the embodiment.

In addition, according to this embodiment, since the intake manifold pressure is compensated with the atmospheric pressure so that the intake manifold pressure compensated with the atmospheric pressure Pb' is higher than the detected intake manifold pressure Pb as shown in the pressure compensation means 11b-1 of FIG. 3, a position of the throttle estimated from the intake manifold pressure compensated with the atmospheric pressure Pb' becomes higher than a position of the throttle estimated from the detected intake manifold pressure Pb. As the result, with the same position of the throttle, drive force is increased by lengthening driving with a low gear when driving on a slope, i.e., as atmospheric pressure lowers, thereby making it possible to provide a feeling of smooth ride. When this is explained with reference to the speed change map of FIG. 4, a plurality of gears are defined by solid lines L15 and L16 when driving on a flat road and a plurality of gears are defined by dotted lines L17 and L18 when driving on a slope in the case of compensation with an atmospheric pressure. If a virtual dotted line L19 indicating a slightly large position of the throttle is drawn on FIG. 4, it is understood that driving with a low gear is longer in the case of compensation with an atmospheric pressure than that without compensation with the same position of the throttle.

Further, according to this embodiment, since the estimated position of the throttle is compensated with the temperature of cooling water for the engine, ON/OFF operation of the air-conditioner mounted on a vehicle, or the ratio of the amount of by-pass air currently under control to the maximum controllable amount of by-pass air, adjusted according to the gear position of the automatic transmission, an appropriate gear is selected in accordance with fluctuations in the load of the engine, thereby making it possible to provide a feeling of smooth ride.

The intake manifold pressure compensated with the atmospheric pressure Pb' and the flow rate K are used in the above embodiment, but the detected intake manifold pressure Pb not compensated with an atmospheric pressure is used directly to estimate a position of the throttle, or an estimated position of the throttle not compensated and using the flow rate K is used to obtain a gear from the speed change map, thereby making it possible to speed up calculation.

Further, although the amount of by-pass air currently under control Qbpa has been described in the case of duty control in the above embodiment, the amount of by-pass air currently under control can be calculated by multiplying the number of steps by the amount of air per step when the air valve 2 is a stepper motor drive valve.

What is claimed is:

1. A speed change control unit for an automatic transmission comprising:
   a) revolution speed detection means for detecting a revolution speed of an engine;
   b) intake manifold pressure detection means for detecting an intake manifold pressure in an air system for the engine;
   c) vehicle speed detection means for detecting a speed of a vehicle;
   d) throttle position estimation means for estimating a position of the throttle intermediate fully open and fully closed positions thereof from the detected revolution speed of the engine and the detected intake manifold pressure; and
   e) speed change decision means for collating the estimated position of the throttle and the detected vehicle speed with a prestored speed change map to shift a gear of the automatic transmission.

2. A speed change control unit for an automatic transmission comprising:
   a) revolution speed detection means for detecting a revolution speed of an engine;
   b) intake manifold pressure detection means for detecting an intake manifold pressure in an air system for the engine;
   c) vehicle speed detection means for detecting a speed of a vehicle;
   d) throttle position estimation means for estimating a position of the throttle intermediate fully open and fully closed positions thereof from the detected revolution speed of the engine and the detected intake manifold pressure; and
   e) speed change decision means for collating the estimated position of the throttle and the detected vehicle speed with a prestored speed change map to shift a gear of the automatic transmission, further comprising
   atmospheric pressure detection means for detecting an atmospheric pressure, and
   pressure compensation means for compensating the detected intake manifold pressure with the detected atmospheric pressure and providing the compensated value to the throttle position estimation means.

3. A speed change control unit for an automatic transmission according to claim 2, wherein
   the pressure compensation means includes a pressure compensation calculation expression, $Pb'=760/Pa \times Pb$, wherein Pa is an atmospheric pressure detected by the atmospheric pressure detection means, Pb is an intake manifold pressure detected by the intake manifold pressure detection means and Pb' is an intake manifold pressure compensated with the atmospheric pressure.

4. A speed change control unit for an automatic transmission according to claim 2, wherein
   the throttle position estimation means comprises first throttle position estimation means for calculating a first estimated position of the throttle when the amount of by-pass air bypassing a throttle valve in the air system for the engine is null and second throttle position estimation means for calculating a second estimated position of the throttle when the amount of by-pass air is the maximum.

5. A speed change control unit for an automatic transmission according to claim 4, wherein
   the first throttle position estimation means includes an estimation map which is preset in accordance with the case where the amount of by-pass air is null, and collates the intake manifold pressure compensated with the atmospheric pressure from the pressure compensation means and the revolution speed from the revolution speed detection means with the estimation map to obtain a first estimated position of the throttle when the amount of by-pass air is null.

6. A speed change control unit for an automatic transmission according to claim 4, wherein
   the second throttle position estimation means includes an estimation map which is preset in accordance with the case where the amount of by-pass air is the maximum, and collates the intake manifold pressure compensated with the atmospheric pressure from the pressure compensation means and the revolution speed from the revolution speed detection means with the estimation map to obtain a second estimated position of the throttle when the amount of by-pass air is the maximum.

7. A speed change control unit for an automatic transmission comprising:
   a) revolution speed detection means for detecting a revolution speed of an engine;
   b) intake manifold pressure detection means for detecting an intake manifold pressure in an air system for the engine;

c) vehicle speed detection means for detecting a speed of a vehicle;

d) throttle position estimation means for estimating a position of the throttle intermediate fully open and fully closed positions thereof from the detected revolution speed of the engine and the detected intake manifold pressure; and e) speed change decision means for collating the estimated position of the throttle and the detected vehicle speed with a prestored speed change map to shift a gear of the automatic transmission, further comprising by-pass air amount detection means for detecting an amount of by-pass air which bypasses a throttle valve in the air system for the engine, by-pass air flow rate calculation means for calculating a ratio of the detected amount of by-pass air to a preset controllable amount of by-pass air, and throttle position compensation means for compensating the estimated position of the throttle with the calculated ratio and providing the compensated value to the speed change decision means.

8. A speed change control unit for an automatic transmission according to claim 7, wherein the by-pass air flow rate calculation means calculates the ratio of the amount of by-pass air currently under control detected by the by-pass air amount detection means to the maximum controllable amount of by-pass air.

9. A speed change control unit for an automatic transmission according to claim 7, wherein the throttle position compensation means includes a position compensation calculation expression, $\theta=(1-K)\times \theta_1+K\times\theta_2$, wherein $\theta_1$ is a first estimated position of the throttle from the first throttle position estimation means for calculating a first estimated position of the throttle when the amount of by-pass air bypassing the throttle valve in the air system for the engine is null, $\theta_2$ is a second estimated position of the throttle from the second throttle position estimation means for calculating a second estimated position of the throttle when the amount of by-pass air is the maximum, and K is a ratio from the by-pass air flow rate calculation means.

* * * * *